United States Patent
Watanabe

(10) Patent No.: US 8,655,928 B2
(45) Date of Patent: Feb. 18, 2014

(54) DEVICE AND METHOD FOR STORING FILE

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 13/072,977

(22) Filed: Mar. 28, 2011

(65) Prior Publication Data

US 2011/0179095 A1 Jul. 21, 2011

Related U.S. Application Data

(63) Continuation of application No. PCT/JP2008/002767, filed on Oct. 2, 2008.

(51) Int. Cl.
*G06F 17/30* (2006.01)

(52) U.S. Cl.
USPC .......................................................... 707/822

(58) Field of Classification Search
None
See application file for complete search history.

(56) References Cited

U.S. PATENT DOCUMENTS

| | | | |
|---|---|---|---|
| 6,609,085 B1* | 8/2003 | Uemura et al. | 702/189 |
| 2003/0191618 A1* | 10/2003 | Gabele et al. | 703/13 |
| 2004/0078636 A1* | 4/2004 | Suzaki | 714/6 |
| 2006/0050302 A1 | 3/2006 | Sawaguchi | |
| 2006/0277154 A1 | 12/2006 | Lunt et al. | |
| 2007/0032995 A1* | 2/2007 | Chien | 703/10 |

FOREIGN PATENT DOCUMENTS

| | | |
|---|---|---|
| JP | 2-100124 | 4/1990 |
| JP | 7-231425 | 8/1995 |
| JP | 9-91316 | 4/1997 |
| JP | 2004-30599 | 1/2004 |
| JP | 2004-030599 | 1/2004 |
| JP | 2006-72892 | 3/2006 |
| JP | 2006-333071 | * 12/2006 |
| JP | 2007-193574 | 8/2007 |
| JP | 2007-249613 | 9/2007 |
| JP | 2008-117260 | * 5/2008 |
| WO | 99/36861 | 7/1999 |
| WO | 2004/010375 | 1/2004 |

OTHER PUBLICATIONS

European Search Report dated Aug. 3, 2012 issued in corresponding European Patent Application No. 08808599.8.
International Search Report for PCT/JP2008/002767, mailed Oct. 28, 2008.
Japanese Office Action mailed Jul. 10, 2012 issued in corresponding Japanese Patent Application No. 2010-531655.

* cited by examiner

*Primary Examiner* — Dinku Gebresenbet
(74) *Attorney, Agent, or Firm* — Staas & Halsey LLP

(57) ABSTRACT

A data file indicating a simulation result output from a computer is received. Based on a file name of a data file, it is determined whether or not each data file is a data file to be visualized, and the data file determined as a data file to be visualized is stored in a file storage unit.

9 Claims, 10 Drawing Sheets

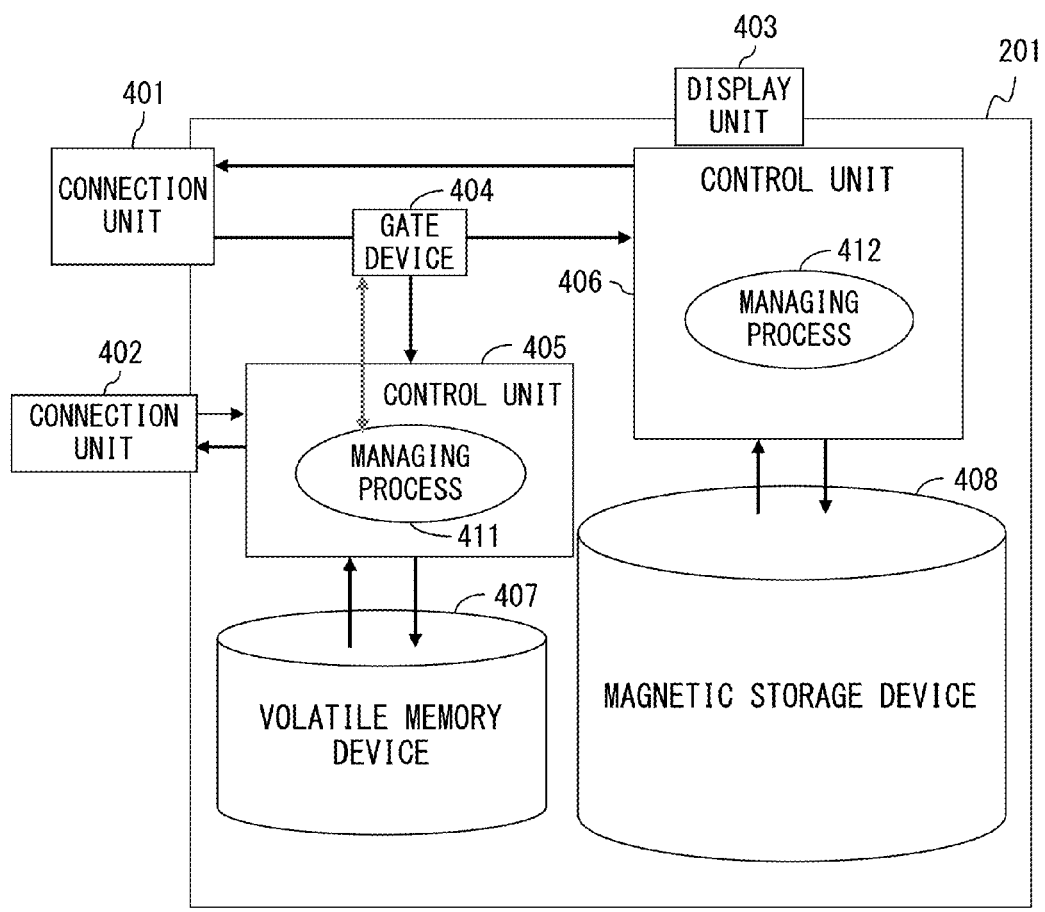
F I G. 4

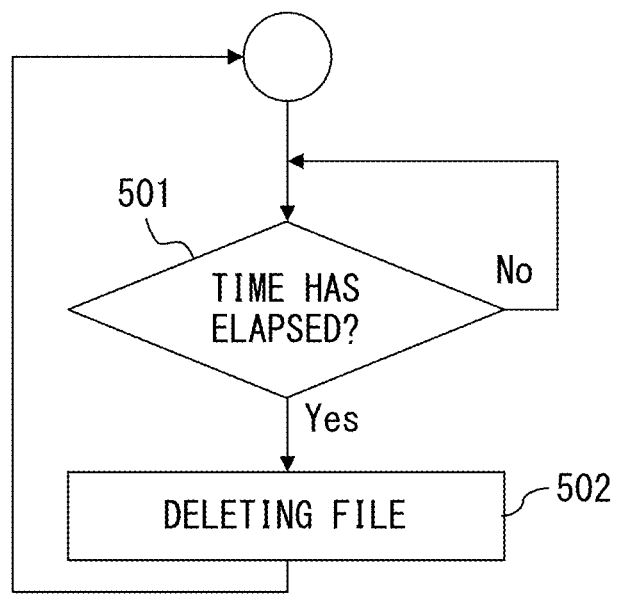
F I G. 5

DEVICE AND METHOD FOR STORING FILE

CROSS-REFERENCE TO RELATED APPLICATIONS

This application is a continuation application of International PCT Application No. PCT/JP2008/002767 which was filed on Oct. 2, 2008.

FIELD

The present invention relates to a device and a method for storing a plurality of data files.

BACKGROUND

FIG. 1 is an example of a configuration of a conventional computer system. The file output from the application program for a simulation executed by a large scale computer 103 is normally stored in a file server device 102. The large scale computer 103 can perform various applications for simulation such as scientific computation etc., and the large scale computer 103 is connected to the file server 102 on a high-speed network. The file server 102 is configured using, for example, a magnetic storage device.

On the other hand, a visualizing computer 101 is normally provided separate from the large scale computer 103, and executes a visualizing application program (hereinafter referred to as a visualizing application), thereby accessing the file server 102. A user transfers a file selected through a visualizing application to the visualizing computer 101, thereby acquiring preferable data.

The application for simulation on the large scale computer 103 divides a simulation result and outputs the resultant divisions to a plurality of data files by spatially dividing an event to be simulated. A time-base dividing process can also be performed on these data files.

The visualizing application on the visualizing computer 101 reads data files divided on a time base, on a spatial base, and for each physical amount, and displays on a screen the event described on a data file in various methods.

In the computer system above, when a huge amount of data of terabyte or petabyte order is output from the large scale computer 103, it is necessary to read the huge amount of data from the file server 102 and visualize the data. In this case, there occurs the problem of a long entire processing time from the data output by the large scale computer 103 to the visualization by the visualizing computer 101 due to the access speed of the magnetic storage device configuring the file server 102 and a necessary file selecting operation, thereby incurring a higher cost.

Therefore, a user of the large scale computer 103, especially a researcher and a computation engineer for scientific computation have a strong demand to reduce the cost.

When data to be displayed is stored in a display device, a conventional technique includes a data processing device for displaying data of a file by transmitting a selection code corresponding to the file to the display device. In addition, there is a simulation result display device for selecting data from a sequence of data of signal processing simulation results, reducing the number of pieces of data, and displaying waveforms.

Patent Document 1: Japanese Laid-open Patent Publication No. 02-100124

Patent Document 2: Japanese Laid-open Patent Publication No. 09-091316

SUMMARY

The present invention aims at shortening the processing time from the data output by a computer to the visualization by a visualizing computer.

A disclosed file storage device includes a reception unit, first and second file storage units, and a control unit.

The reception unit receives a plurality of data files indicating a simulation result output from a computer. The first file storage unit stores the plurality of received data files, and the second file storage unit stores a data file to be visualized among the data files. The control unit determines based on the file names of the plurality of received data files whether or not each data file is a data file to be visualized, and stores a data file to be visualized in the second file storage unit.

With the above-mentioned file storage device, a data file to be visualized is automatically selected from among a plurality of data files output from a computer, and stored in the second file storage unit. Since the number of the data files stored in the second file storage unit is smaller than that of the data files stored in the first file storage unit, the data files to be visualized can be efficiently read from the second file storage unit. In addition, since a user does not have to select a data file, the necessary processing time for the visualization can be shortened.

BRIEF DESCRIPTION OF DRAWINGS

FIG. 4 is a configuration diagram of a file server;

FIG. 5 is a flowchart of a file deleting process;

DESCRIPTION OF EMBODIMENTS

An embodiment of the present invention is described below in detail with reference to the attached drawings.

Figure 1:
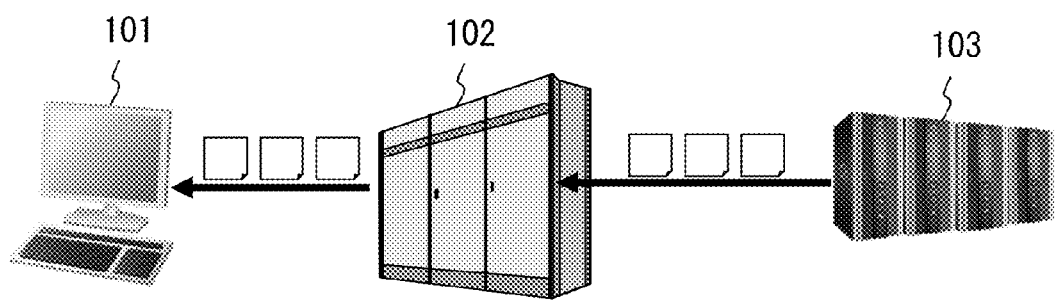
FIG. 1 is a configuration diagram of a conventional computer system.
Figure 2:
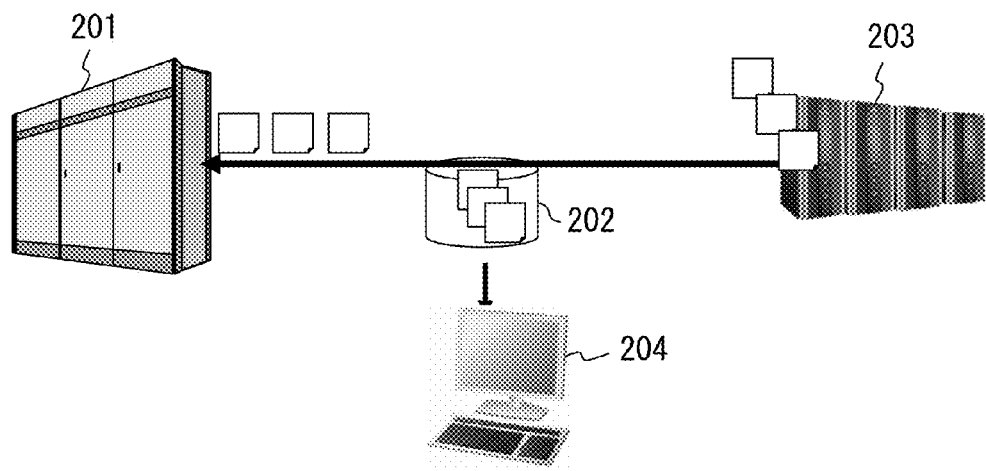
FIG. 2 is a configuration diagram of a first computer system.

FIG. 2 illustrates an example of the configuration the computer system of an embodiment. The computer system includes a cache device 202 on the route from a large scale computer 203 to a file server 201, and a data file to be visualized is copied to the cache device 202 among the data files transferred to the file server 201. Thus, since a visualizing computer 204 can efficiently read a data file from the cache device 202, the process can be performed in a shorter time than the reading process through the conventional file server.

In addition, the data file output from the large scale computer 203 is assigned as a file name an integer or a character string indicating the data contents such as a time step, a space area, a physical amount, etc. Thus, a user can select a data file of time-series data for each user-specified time step, and a space area and a physical amount can also be easily selected. Thus, the time required to select a data file can be shortened by assigning a file name which enables data contents to be easily recognized.

Figure 3:
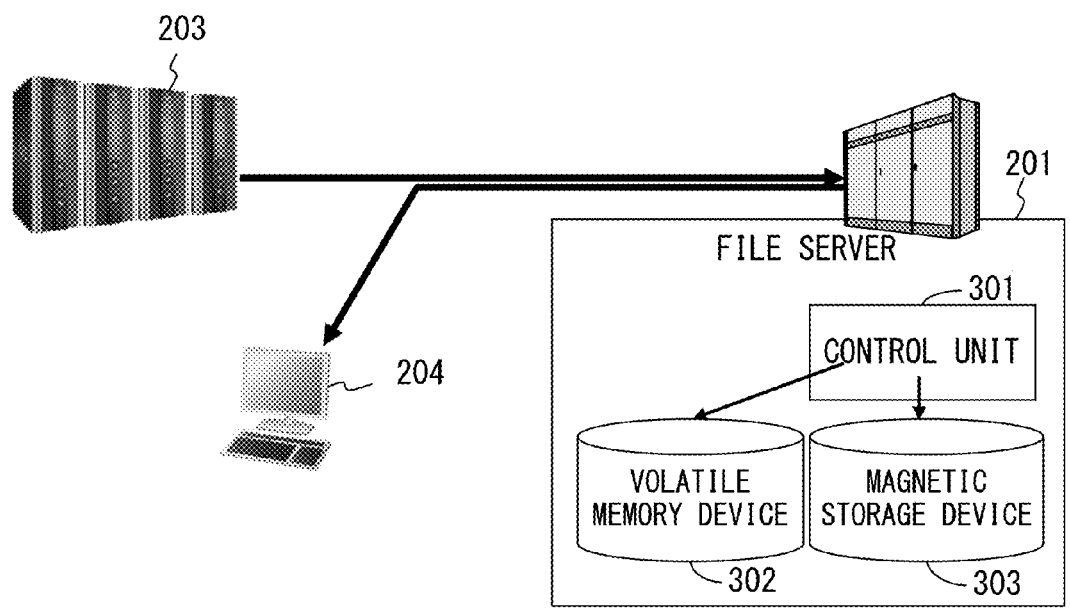
FIG. 3 is a configuration diagram of a first computer system.

FIG. 3 illustrates an example of the configuration of the computer system in which the cache device 202 illustrated in FIG. 2 is provided in the file server 201. The file server 201 includes a control unit 301, a volatile memory device 302, and a magnetic storage device 303. The magnetic storage device 303 can be replaced with another storage device.

The volatile memory device 302 corresponds to the cache device 202, and is a storage device capable of high-speed access in writing and reading unlike the magnetic storage device 303. The control unit 301 stores the data file output from the large scale computer 203 in the magnetic storage device 303, and determines from the file name assigned to the data file whether or not the data file is to be copied to the volatile memory device 302 based on a prescribed criterion. Then, the data file is copied to the volatile memory device 302 only when it is necessary.

With the above-mentioned file server 201, only a data file to be visualized is accumulated in the high-speed accessible volatile memory device 302, and the visualizing computer 204 can access a file at a high speed as compared with the magnetic storage device 303.

FIG. 4 illustrates an example of another configuration of the file server 201. The file server 201 in FIG. 4 includes connection units 401 and 402, a display unit 403, a gate device 404, control units 405 and 406, a volatile memory device 407, and a magnetic storage device 408. The magnetic storage device 408 can be replaced with another storage device.

The connection unit 401 is connected to the large scale computer 203 over a communication network, and the connection unit 402 is connected to the visualizing computer 204 over the communication network. The display unit 403 displays the state of the file server 201.

The gate device 404 is provided on the data path between the connection unit 401 and the control unit 406. The gate device 404 is provided only on the receiving side path for transferring the data received from a network to the control unit 406, and is not provided on the transmitting side path for transferring a signal from the control unit 406 to the connection unit 401.

In the gate device 404, a buffer is provided for transferring data efficiently to both of the control units 405 and 406. The buffer temporarily accumulates a packet as a transfer unit of a divided data file. A processing device such as a central processing unit (CPU) etc. is provided in the gate device 404 to execute an instruction received from the control unit 405.

A managing process 412 of the control unit 406 performs control of storing a data file transferred from the gate device 404 in the magnetic storage device 408, control of the display unit 403, and various controlling operations of the entire file server 201. The magnetic storage device 408 includes a plurality of magnetic storage media and accumulates a plurality of data files. The managing process 412 determines in which area of which medium in the magnetic storage device 408 a data file is to be stored, and stores the data file in the determined area.

A managing process 411 of the control unit 405 performs control of the gate device 404, control of the volatile memory device 407, and control the interface with the visualizing computer 204. The caching operation of the file server 201 can be efficiently controlled by providing the control unit 405 independent of the control unit 406.

The managing process 411 constantly monitors the gate device 404, and determines whether or not a data file is to be cached when a transmission start notification of the data file is received from the large scale computer 203. Then, the gate device 404 is controlled so that a data file which is not to be cached can be transferred only to the control unit 406, and a data file to be cached can be transferred to the control units 405 and 406.

The managing process 411 determines in which area in the volatile memory device 407 the data file is to be stored, and stores the data file transferred from the gate device 404 in the determined area.

The accident of erroneously deleting a data file can be avoided by the managing process 411 managing data files. In addition, by transferring a data file from the gate device 404 to the volatile memory device 407, the transferring process can be more efficiently performed than in the case in which the data file is stored in the magnetic storage device 408 and then transferred to the volatile memory device 407.

The path between the connection unit 402 and the control unit 405 has an efficient transferring function to transmit a data file from the volatile memory device 407 to the visualizing computer 204 at a high speed. Concretely, a transmitting path having a high transfer efficiency to transmit a large capacity of files and a receiving path for receiving a copy completion notification from the visualizing computer 204 are provided. In addition to the connection unit 401, the connection unit 402 is provided, thereby allowing the visualizing computer 204 to access a data file regardless of the communication state with the large scale computer 203.

Upon receipt of access from the visualizing computer 204 through a hyper text transfer protocol (HTTP) etc., the managing process 411 transfers the display information about a user interface screen. A user specifies on the user interface screen a data file to be copied to the volatile memory device 407. By the managing process 411 for managing data files providing the user interface screen, an efficient operation of the file server 201 can be performed.

Next, the control by the control unit 405 in the managing process 411 is described below in detail.

The managing process 411 has a function of identifying a file name, and determines whether or not a file is to be copied to the volatile memory device 407 according to the information about a processor number, an output date and time, etc. automatically assigned by the large scale computer 203, and the information about a time step, a space area, etc. specified by a user. The user-specified information is reported to the managing process 411 from the visualizing computer 204 through the connection unit 402.

A file name indicates, for example, the position of time and space, a physical amount described in a file, etc. and is specified by a user. The managing process 411 reads an integer value indicating time, an integer value indicating a space area, etc., and determines based on the file name whether or not the read value is to be copied to the volatile memory device 407. In addition, regardless of the file name, all files are stored in the magnetic storage device 408 through the control unit 406.

Generally, the capacity of the volatile memory device 407 is often designed smaller than that of the magnetic storage device 408. In this case, if a file selected by a user and copied to the visualizing computer 204 remains as is, the amount of data of files exceeds the capacity in proportion to the number of users. Then, the managing process 411 has the function of deleting a file held in the volatile memory device 407.

A file is deleted when, for example, the time in which files are held exceeds a prescribed time. In this case, as illustrated in FIG. 5, the managing process 411 periodically checks whether or not the retention time of each file has exceeded a prescribed time (step 501), and if the retention time has exceeded the prescribed time, the corresponding file is deleted (step 502). The prescribed time can be specified by an operator of the file server 201 as time limit for management, or can be specified by a user.

Figure 6:
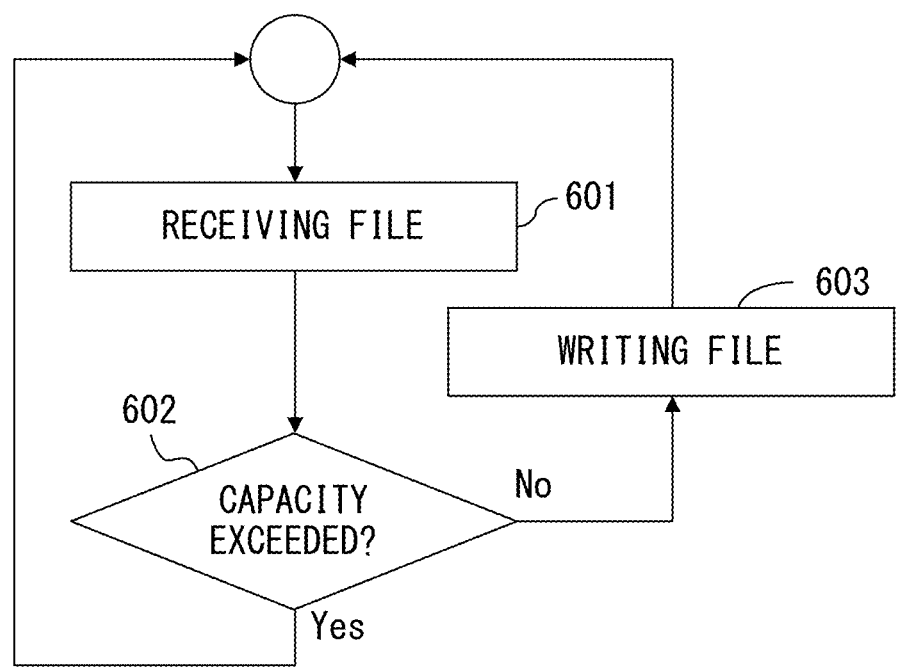
FIG. 6 is a flowchart of a file writing process.

FIG. 6 illustrates an example of a file writing process by the managing process 411. Upon receipt of a notification of the amount of data of a received file from the gate device 404, the managing process 411 checks whether or not the total amount of data of the file and files already stored in the volatile memory device 407 has exceeded the capacity of the volatile memory device 407 (step 601). If the total amount of data does not exceed the capacity of the volatile memory device 407 (NO in S602), the received file is written to the volatile memory device 407 (step 603). If the total amount of data exceeds the capacity of the volatile memory device 407 (YES in S602), the file is not accepted. Afterwards, when a file which has been long stored is deleted and a vacant area is detected, a new file is accepted.

Described next is an algorithm of selecting a file to be copied to the volatile memory device 407.

The large scale computer 203 is, for example, a parallel computer configured by a plurality of processors, and each processor performs the calculation of the physical amount of a specified area among all space areas to be simulated. In this case, the file of an output simulation result generally has the following information.

(1) An index of each node (necessary point for calculation) in all space areas (2) A local index of each node A local index is assigned to each node in each processor, and corresponds one to one to the index of (1) above.

(3) A time step (4) Coordinates of each node (5) A list of plural nodes connected for generating an element (6) A physical amount on each node (scalar, vector, etc.)

(7) A physical amount on each element (scalar, vector, tensor, etc.)

(8) A list of nodes on the boundary of areas (list of indexes of (2) above)

Generally, when a simulation result is visualized, the shape of a display target (object etc.) is displayed based on the indexes (1) and (2) above using (4) and (5), and the value of the physical amount is displayed using (6) and (7). These pieces of information are divided and integrated to generate a data file to be visualized.

A file name of a data file can be expressed in, for example, the following format.

prefix.ttt.xxx.yyy.zzz.uuu.extention where the prefix is a character string specified by a user, ttt is an integer value indicating a time step. xxx, yyy, and zzz are an integer value indicating the X coordinate, the Y coordinate, and the Z coordinate of an area. uuu is an integer value indicating a physical amount.

As the header of each packet which is a file transfer unit, a time stamp MMDDhhmmss indicating the date and time and a processor identifier (ID) on the generating side are described in addition to the file name above.

A user specifies a file to be copied on the visualizing computer 204 by inputting the file specification condition indicating the range of a file name. As a file specification condition, the range of the character string or the integer value of all or a part of a file name is input.

For example, as a specification condition of a time step, a visualizing time interval n (integer) is input. In this case, a packet output for every n steps is selected. As a specification condition of space, the upper limit m2 and lower limit m1 indicating the range of the value of each coordinate are input such as xxx>=m1 && xxx<=m2. As a specification condition of a physical amount, an integer value indicating a visualizing physical amount is input such as uuu=1. Various data can be used as a physical amount regardless of electric, electromagnetic, and chemical fields.

Furthermore, a part of header information can be added as a file specification condition. For example, as a specification condition of date and time, an upper limit and a lower limit indicating a time range are input. As a specification condition of a processor ID, an upper limit and a lower limit indicating the range of values of a processor ID are input.

Figure 7:
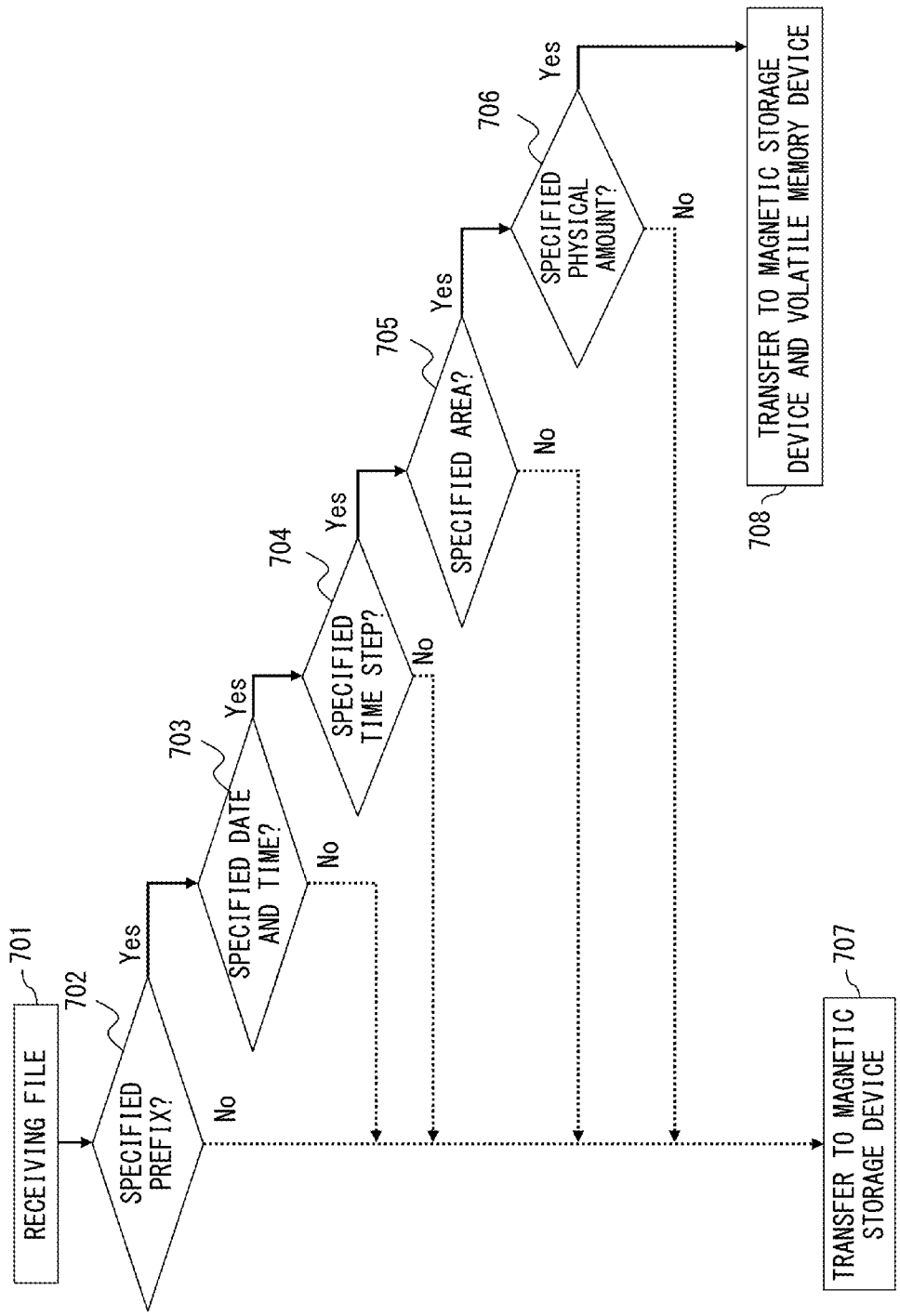
FIG. 7 is a flowchart of a file selecting process.

FIG. 7 illustrates an example of a file selecting process by the managing process 411 when such a file name is used. Upon receipt of a notification of the file name and header information of a packet received from the gate device 404 (step 701), the managing process 411 first checks whether or not the prefix of the file name matches the specified prefix (step 702).

If the prefix of the file name matches the specified prefix (YES in S702), it is further checked whether or not the time stamp of the header information is included in the specified time range (step 703). If the time stamp is included in the specified time range (YES in S703), it is checked whether or not the integer value indicating the time step of the file name corresponds to the specified time step (step 704).

For example, when the time interval n is specified, and if the remainder obtained by dividing the time step ttt by n is 0, then the time step ttt corresponds to the specified time step. On the other hand, if the remainder is not 0, the time step ttt does not correspond to the specified time step.

If the integer value indicating the time step corresponds to the specified time step (YES in step 704), it is then checked whether or not the integer value indicating the area of the file name is included in the specified area range (step 705). If the integer value indicating the area is included in the specified area range (YES in S705), then it is checked whether or not the integer value indicating the physical amount of the file name corresponds to the specified physical amount (step 706).

Then, if the integer value indicating the physical amount corresponds to the specified physical amount (YES in S706), the gate device 404 is instructed to transfer the received packet to both of the volatile memory device 407 and the magnetic storage device 408 (step 708). On the other hand, if the information in the received packet does not correspond to the specified information in one of steps 702 through 706, the gate device 404 is instructed to transfer the packet only to the magnetic storage device 408 (step 707).

The above-mentioned file selecting process is summarized as follows.

(1) Time Stamp

If the time stamp MMDDhhmmss of the header information is in a prescribed range, the packet is selected. The time stamp is automatically assigned by the large scale computer 203. For example, the time from 19:21 to 19:25 on July 7 can be specified as 0707192100~0707192500.

(2) Time Step

If the remainder obtained by dividing ttt in the file name by the specified time interval n, then the packet is selected. For example, when n=2, a packet such as prefix.002.xxx.yyy.zzz.uuu, prefix.004.xxx.yyy.zzz.uuu, etc. is selected.

(3) Area

If xxx, yyy, and zzz in the file name are included in the specified area range, the packet is selected. For example, xxx>=m1 && xxx<=m2, m1=2, m2=6 are specified, a packet including prefix.ttt.2.yyy.zzz.uuu~prefix.ttt.6.yyy.zzz.uuu etc. is selected.

(4) Physical Amount

If uuu in the file name is a specified integer value, the packet is selected. For example, when uuu=001 (x component of velocity) is specified, a packet including prefix.ttt.xxx.yyy.zzz.001 etc. is selected.

The physical amount can also be described by a character string. In this case, for example, uuu=vx (x component of velocity) etc. is specified, and a packet prefix.ttt.xxx.yyy.zzz.vx etc. is selected.

Another example of the file specification condition and the selecting process is described below.

(5) Processor ID

As described below, ppp can be added to the file name as a processor ID indicating the processor on the generating side. The ppp is automatically assigned by the large scale computer 203.

prefix.ppp.ttt.xxx.yyy.zzz.uuu.extension

In this case, if ppp in the file name is included in the specified range of processor ID, the packet is selected. For example, if ppp>=k1 && ppp<=k2, k1=2, k2=5 is specified, a packet of prefix.002.ttt.xxx.yyy.zzz.uuu~prefix.005.ttt.xxx.yyy.zzz.uuu etc. is selected. In addition, if ppp=[01?] is specified, a packet of prefix.010.ttt.xxx.yyy.zzz.uuu prefix.019.ttt.xxx.yyy.zzz.uuu etc. is selected.

Since each processor is generally assigned a specific area, a prescribed area range can be specified by specifying the range of processor ID.

(6) Phase

As described below, a character string or an integer value hhh indicating the phase of a fluid, a solid, etc. can be added to the file name.

prefix.hhh.ttt.xxx.yyy.zzz.uuu.extension

In this case, if hhh in the file name is a specified character string or integer value, the packet is selected. For example, when hhh=f (fluid) is specified, a packet of prefix.f.ttt.xxx.yyy.zzz.uuu. etc. is selected. If hhh=s (solid) is specified, a packet of prefix.s.ttt.xxx.yyy.zzz.uuu. etc. is selected.

(7) Boundary Layer

The specification of an area is not necessarily performed by spatially divided coordinates. For example, in the coupled analysis of a fluid and a structure, all or a part of the area of the fluid part can be specified or only a boundary layer can be specified because the flow near the boundary is important. Similarly in analyzing the structure, the stress distribution of the contact portion between the structures, that is, several layers of the computational grid generated in parallel to the boundary surface can be selectively specified.

In this case, as described below, the character string or an integer value bbb indicating a boundary layer can be added to a file name.

prefix.bbb.ttt.xxx.yyy.zzz.uuu.extension

If bbb in the file name is the specified character string or integer value, the packet is selected. For example, a prescribed flag is set on a packet having data around the boundary (for example, bbb=001), and flag is not set on a packet having data of other areas (for example, bbb=000), thereby selecting a boundary layer.

(8) Boundary Condition

An area which has a boundary condition can also be selected in the same method as described in (7) above.

(9) Real Part and Imaginary Part

In the computer simulation, a non-real space such as an imaginary space can be processed. In this case, as described below, a character string or an integer value ccc indicating the type of a real part or an imaginary part can be added to a file name.

prefix.ccc.ttt.xxx.yyy.zzz.uuu.extension

If ccc in the file name is a specified character string or integer value, the packet is selected. For example, discrimination can be performed by describing ccc=re or 000 on a packet of a real part and ccc=im or 001 on a packet of an imaginary part. When data of both a real space and a mapping space is output, one of them can be selected in the similar method.

(10) Related Physical Amount

For example, as in meteoric and weather simulations and a living body simulation, when there are various types of physical amount, it is necessary to perform visualization with plural physical amounts associated with one another. The same holds true with an electric event related to a chemical event. When the above-mentioned simulations are performed, it is also necessary to display the behavior of plural physical amounts associated as a visualizing process. In this case, as described below, a character string or an integer value rrr indicating physical amounts associated with each other can be added to a file name.

prefix.ttt.xxx.yyy.zzz.uuu.rrr.extension

If rrr in the file name is a specified character string or integer value, the packet is selected. For example, a plurality of classes, for example, 000 through 005 are defined as rrr, and a user assigns a value of the same class to the file names of a plurality of files describing related physical amounts in advance. Therefore, the user only has to specify rrr to simultaneously specify the files to be visualized.

For example, when rrr=001 is specified, packets of prefix.ttt.xxx.yyy.zzz.uuu.001 and prefix.ttt.xxx.yyy.zzz.sss.001 are selected.

The above-mentioned format of a file name is an example only, and a format in which the order of each item (character string or integer value) is exchanged can also be applied. In addition, it is not necessary to use all items, and only necessary items for a simulation can be selectively combined and used.

Furthermore, the simulation target of the large scale computer 203 is not limited to scientific computation, but various fields such as economy, finance, etc. can be computer simulation targets. Therefore, the physical amount can be replaced with various parameters such as an economic index, a financial index, etc.

Figure 8:
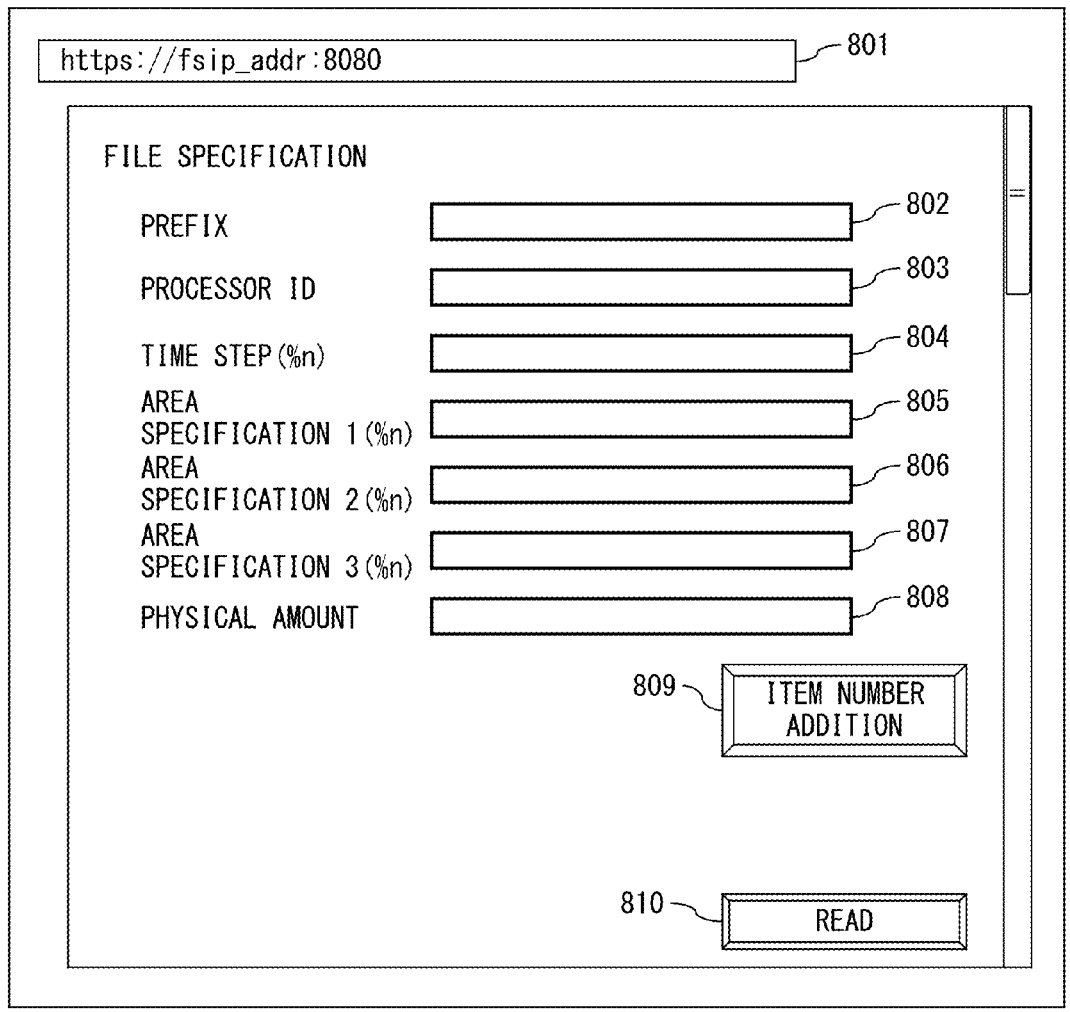
FIG. 8 illustrates a user interface screen.

FIG. 8 is an example of a user interface screen displayed on the visualizing computer 204. A user inputs on the user interface screen a specification condition of a file to be copied to the volatile memory device 407.

A user first activates a WEB browser on the visualizing computer 204, inputs a predetermined uniform resource locator (URL) to an address bar 801, and accesses the user interface screen. The control unit 405 of the file server 201 activates the HTTP server function, and can provide a user with a user interface without including the function of a window manager, etc. in the file server 201.

A user inputs specification values of a prefix, a processor ID, and a time step to boxes 802, 803, and 804, respectively, inputs specification values of an area to boxes 805 through 807, and inputs a specification value of a physical amount to a box 808. Other specification items can be added by pressing an item number addition button 809. When the input of specification values is completed, a read button 810 is pressed to transmit a specification condition to the managing process 411.

Not only the visualizing computer 204 but any other computer capable of logging in the large scale computer 203 and accessing a file in the volatile memory device 407 can use the same user interface. By registering the user interface in setting file form in a device accessible by the managing process 411, the same operability as the user interface screen can be provided.

Figure 9:
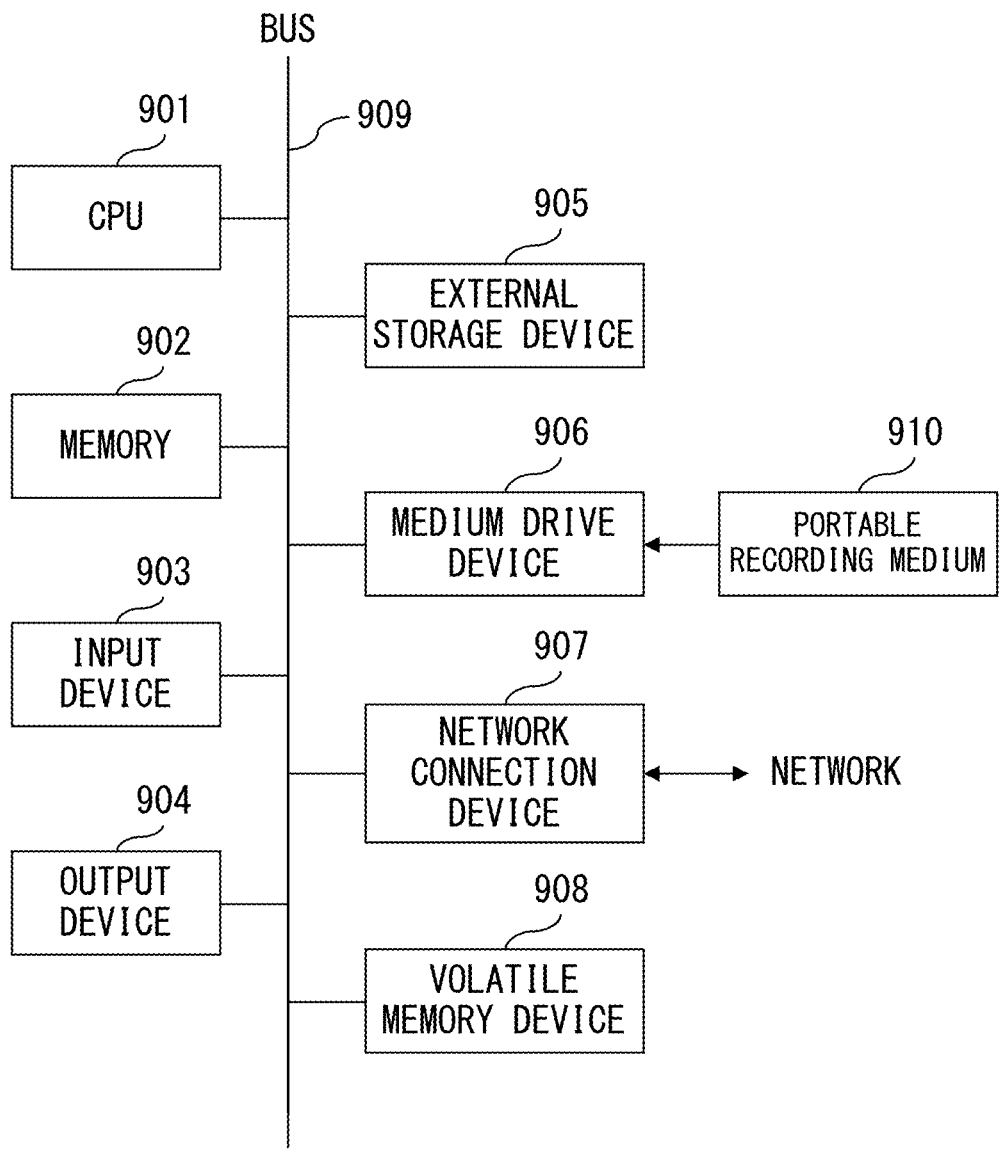
FIG. 9 is a configuration diagram of an information processing device.

The file server 201 illustrated in FIGS. 3 and 4 can also be configured by using an information processing device (computer) as illustrated in FIG. 9. The information processing device in FIG. 9 includes a CPU 901, memory 902, an input device 903, an output device 904, an external storage device 905, a medium drive device 906, a network connection device 907, and a volatile memory device 908, and these components are connected to one another by a bus 909.

The memory 902 includes, for example, a read only memory (ROM), a random access memory (RAM), etc., and stores a program and data used in processing. The CPU 901 performs processing similar to the processing of the control unit 301 or the managing processes 411 and 412 by executing a program using the memory 902.

The input device 903 is, for example, a keyboard, a pointing device, etc., and is used in inputting an instruction and information from an operator. The output device 904 is, for example, a display, a printer, a speaker, etc., and is used in outputting an inquiry and process result to the operator.

The external storage device 905 is, for example, a magnetic disk device, an optical disk device, a magneto-optical disk device, a tape device, etc. The magnetic storage devices 303 and 408 correspond to the external storage device 905. The information processing device stores a program and data in the external storage device 905, and loads them into the memory 902 as necessary and uses them.

The medium drive device 906 dries the portable recording medium 909, and accesses the recorded contents. The portable recording medium 909 is any computer-readable recording medium such as a memory card, a flexible disk, an optical disk, a magneto-optical disk, etc. An operator stores a program and data in the portable recording medium 909, and loads them into the memory 902 as necessary and uses them.

The network connection device 907 is connected to a communication network such as an intranet, the Internet, etc., and converts data used in the communications with the large scale computer 203 and the visualizing computer 204. The network connection device 907 includes devices similar to the connection units 401 and 402 and the gate device 404. In addition, the information processing device receives a program and data as necessary from an external device through the network connection device 907, loads them into the memory 902 and uses them.

Figure 10:
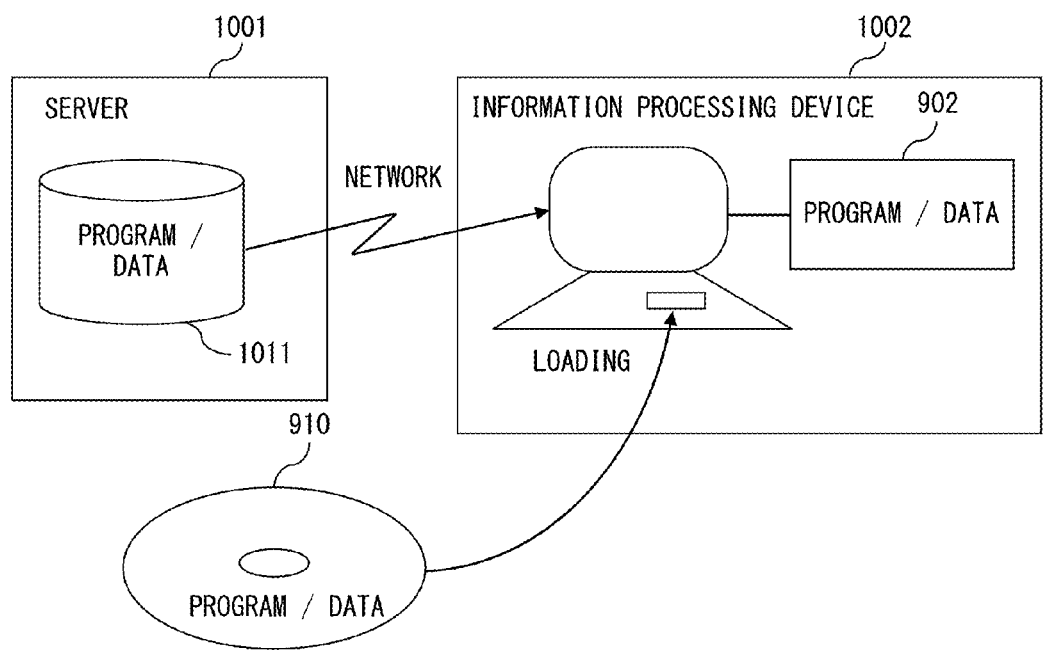
FIG. 10 illustrates a method of providing a program and data.

FIG. 10 illustrates a method of providing a program and data for the information processing device in FIG. 9. The program and data stored in the portable recording medium 909 or a database 1011 in an external device 1001 are loaded into the memory 902 of an information processing device 2502. The external device 1001 generates a carrier signal for carrying the program and data, and transmits the signal to the information processing device 1002 through any transmission medium on the communication network. The CPU 901 executes the program using the data, and performs the above-mentioned processes.

What is claimed is:

1. A file storage device, comprising:
a reception unit configured to receive a plurality of data files indicating a simulation result output from a computer;
a first file storage unit configured to store the data files;
a second file storage unit that is accessible at a higher speed compared with the first file storage unit;
a buffer unit provided on a file transfer path from the reception unit to the first file storage unit to buffer each data file;
a control unit to determine, based on a file name of each data file, whether the data file is to be visualized, and to store each data file to be visualized in the second file storage unit, the control unit selecting the data file to be visualized when a remainder obtained by dividing a value indicating a time step and included in a file name of the data file by a time interval is zero and when information about a physical amount to be simulated and included in the file name corresponds to a prescribed physical amount; and
a transmission unit configured to transmit the data file to be visualized to a visualizing computer,
wherein the reception unit and the transmission unit are separately implemented.

2. The file storage device according to claim 1, wherein when a value indicating an area to be simulated and included in the file name is a value within a prescribed range, the control unit selects the data file as the data file to be visualized.

3. The file storage device according to claim 1, wherein when processor identification information identifying any processor of the computer and included in the file name corresponds to a prescribed processor, the control unit selects the data file as the data file to be visualized.

4. The file storage device according to claim 1, wherein when information about a phase to be simulated and included in the file name corresponds to a prescribed phase, the control unit selects the data file as the data file to be visualized.

5. The file storage device according to claim 1, wherein when information indicating a boundary layer or a boundary condition is included in the file name, the control unit selects the data file as the data file to be visualized.

6. The file storage device according to claim 1, wherein when information indicating a real part, an imaginary part, a real space, or an imaginary space is included in the file name, the control unit selects the data file as the data file to be visualized.

7. The file storage device according to claim 1, wherein when information indicating a physical amount correlated to a physical amount described in another file is included in the file name, the control unit selects the data file as the data file to be visualized.

8. A non-transitory computer-readable recording medium storing a program used to direct an information processing device to perform:
receiving a plurality of data files indicating a simulation result and output from a computer by a reception unit;
determining based on a file name of each data file whether the data file is to be visualized, including selecting the data file to be visualized when a remainder obtained by dividing a value indicating a time step and included in a file name of the data file by a time interval is zero and when information about a physical amount to be simulated and included in the file name corresponds to a prescribed physical amount;
storing the plurality of data files in the first file storage unit;
storing the data file to be visualized in a second file storage unit that is accessible at a higher speed compared with the first file storage unit; and
transmitting the data file to be visualized to a visualizing computer by a transmission unit, wherein the reception unit and the transmission unit are separately implemented.

9. A file storing method, comprising:

receiving a plurality of data files indicating a simulation result output from a computer by a reception unit;

buffering each data file by a buffer unit provided on a file transfer path from the reception unit to a first file storage unit;

determining based on a file name of each data file whether the data file is to be visualized, including selecting the data file to be visualized when a remainder obtained by dividing a value indicating a time step and included in a file name of the data file by a time interval is zero and when information about a physical amount to be simulated and included in the file name corresponds to a prescribed physical amount;

storing the plurality of data files in the first file storage unit;

storing the data file to be visualized in a second file storage unit that is accessible at a higher speed compared with the first file storage unit; and transmitting the data file to be visualized to a visualizing computer by a transmission unit, wherein the reception unit and the transmission unit are separately implemented.

* * * * *